(12) United States Patent
Wöstmann (10) Patent No.: US 12,318,712 B2
(45) Date of Patent: Jun. 3, 2025

(54) APPARATUS FOR FILTERING A FLUID, IN PARTICULAR A PLASTIC MELT HAVING IMPURITIES, AND A VALVE ARRANGEMENT FOR SUCH A FLUID

(71) Applicant: Nordson Corporation, Westlake, OH (US)

(72) Inventor: Stefan Wöstmann, Sassenberg (DE)

(73) Assignee: Nordson Corporation, Westlake, OH (US)

( * ) Notice: Subject to any disclaimer, the term of this patent is extended or adjusted under 35 U.S.C. 154(b) by 316 days.

(21) Appl. No.: 17/780,639

(22) PCT Filed: Nov. 23, 2020

(86) PCT No.: PCT/US2020/061723
§ 371 (c)(1),
(2) Date: May 27, 2022

(87) PCT Pub. No.: WO2021/108284
PCT Pub. Date: Jun. 3, 2021

(65) Prior Publication Data
US 2023/0356118 A1  Nov. 9, 2023

(30) Foreign Application Priority Data
Nov. 28, 2019  (EP) .................................. 19212184

(51) Int. Cl.
*B01D 29/05* (2006.01)
*B01D 29/96* (2006.01)
(Continued)

(52) U.S. Cl.
CPC ............. *B01D 29/05* (2013.01); *B01D 29/96* (2013.01); *B01D 35/12* (2013.01);
(Continued)

(58) Field of Classification Search
CPC ........ B01D 29/05; B01D 29/96; B01D 35/12; B01D 35/1573; B29B 13/00; F16K 3/262;
(Continued)

(56) References Cited

U.S. PATENT DOCUMENTS

| 5,368,276 A | 11/1994 | Pfeiffer |
| 5,916,443 A | 6/1999 | Mueller et al. |

(Continued)

FOREIGN PATENT DOCUMENTS

| CA | 1133216 A | 10/1982 |
| CN | 101506555 A | 8/2009 |

(Continued)

OTHER PUBLICATIONS

IPEA/409—International Preliminary Report on Patentability Mailed on Jun. 9, 2022 for WO Application No. PCT/US20/061723.
(Continued)

*Primary Examiner* — Waqaas Ali
(74) *Attorney, Agent, or Firm* — BakerHostetler (57) ABSTRACT

In one example, an apparatus for filtering a fluid (e.g., a plastic melt having impurities) includes a housing which has at least one inlet for introduction of the fluid and an outlet for delivery of the fluid and a cavity formed in the housing by wall portions of the housing for receiving a sieve support, and a sieve support which is arranged moveably in the cavity of the housing and has a longitudinal axis for receiving at least one filter element for filtering the fluid. The sieve support externally has a plurality of integrally formed raised portions and/or raised portions and/or recesses are formed at wall portions of the housing, that delimit the cavity, such that provided between the wall portion and the sieve support are a plurality of gaps/cavities, by means of which a slight fluid flow is enabled in operation. Another example concerns a valve arrangement.

20 Claims, 7 Drawing Sheets

(51) Int. Cl.
    *B01D 35/12*     (2006.01)
    *B01D 35/157*     (2006.01)
    *B29B 13/00*     (2006.01)
    *F16K 3/26*     (2006.01)
    *F16K 5/04*     (2006.01)

(52) U.S. Cl.
    CPC .......... *B01D 35/1573* (2013.01); *B29B 13/00* (2013.01); *F16K 3/262* (2013.01); *F16K 5/0407* (2013.01)

(58) Field of Classification Search
    CPC ............... F16K 5/0407; B29C 48/2554; B29C 48/6914; B29C 48/693; B29C 48/6912
    See application file for complete search history.

(56) References Cited

U.S. PATENT DOCUMENTS

| | | |
|---|---|---|
| 2009/0057592 A1 | 3/2009 | Lakhan et al. |
| 2011/0042601 A1 | 2/2011 | Wears |
| 2013/0020247 A1 | 1/2013 | Saemann |
| 2013/0087498 A1 | 4/2013 | Wostmann et al. |
| 2013/0092253 A1 | 4/2013 | Steinmann |
| 2018/0071967 A1 | 3/2018 | Schrder et al. |
| 2019/0009448 A1 | 1/2019 | Wöstmann et al. |
| 2019/0299136 A1 | 10/2019 | Neiser |

FOREIGN PATENT DOCUMENTS

| | | | | |
|---|---|---|---|---|
| CN | 107803055 A | 3/2018 | | |
| DE | 1934224 U | 3/1966 | | |
| DE | 135595 A1 | 5/1979 | | |
| DE | 2942849 A1 * | 5/1981 | | |
| DE | 29611292 U1 | 10/1996 | | |
| DE | 102010029591 A1 | 12/2011 | | |
| DE | 202011106715 U1 | 1/2012 | | |
| DE | 202014005235 U1 * | 8/2014 | ............... | B01J 2/20 |
| DE | 102017115295 B3 | 10/2018 | | |
| EP | 0707878 A1 | 4/1996 | | |
| EP | 0806281 A1 | 11/1997 | | |
| EP | 0915729 B1 | 6/2003 | | |
| EP | 1645396 A2 | 4/2006 | | |
| EP | 2548711 A1 | 1/2013 | | |
| EP | 3308939 A1 | 4/2018 | | |
| EP | 3308940 A1 | 4/2018 | | |
| GB | 0563831 A | 8/1944 | | |
| GB | 0915341 A | 1/1963 | | |
| GB | 1128001 A | 9/1968 | | |
| GB | 1464155 A | 2/1977 | | |
| GB | 2017518 A | 10/1979 | | |
| JP | 2003-290609 A | 10/2003 | | |
| JP | 2013-082225 A | 5/2013 | | |
| JP | 2018-065384 A | 4/2018 | | |
| JP | 2019-030872 A | 2/2019 | | |
| SU | 1388308 A1 | 4/1988 | | |
| WO | WO-9841305 A2 * | 9/1998 | ............. | B01D 29/01 |
| WO | 2011/086173 A2 | 7/2011 | | |
| WO | 2012/153115 A1 | 11/2012 | | |
| WO | 2014/052057 A1 | 4/2014 | | |
| WO | 2017/025159 A1 | 2/2017 | | |
| WO | 2017/151481 A1 | 9/2017 | | |
| WO | 2018/162292 A1 | 9/2018 | | |

OTHER PUBLICATIONS

ISA/220—Notification of Transmittal or Search Report and Written Opinion of the ISA, or the Declaration Mailed on Mar. 11, 2021 for WO Application No. PCT/US20/061723.

* cited by examiner

APPARATUS FOR FILTERING A FLUID, IN PARTICULAR A PLASTIC MELT HAVING IMPURITIES, AND A VALVE ARRANGEMENT FOR SUCH A FLUID

CROSS-REFERENCE TO RELATED APPLICATIONS

This application is the National Stage Application of International Patent Application No. PCT/US2020/061723, filed Nov. 23, 2020, which claims the benefit of European Patent Application No. EP 19212184.6, filed on Nov. 28, 2019, the disclosure of each of which is hereby incorporated by reference as if set forth in its entirety herein.

BACKGROUND

The invention concerns an apparatus for filtering a fluid, in particular a plastic melt having impurities, comprising a housing which has at least one inlet for introduction of the fluid and an outlet for delivery of the fluid and a cavity formed in the housing by wall portions of the housing for receiving a sieve support, and a sieve support which is arranged moveably in the cavity of the housing and has a longitudinal axis for receiving at least one filter element for filtering the fluid.

Such apparatuses for filtering a fluid are known from the state of the art. Filtering apparatuses of the general kind set forth have at least one sieve support in which one or more filter elements are arranged. The sieve support is accommodated portion-wise in a housing cavity and is arranged moveably relative thereto. In that situation the sieve support can be moved into a filtering position in which fluid supplied by way of the housing inlet is guided and filtered through the filter of the sieve support in the direction of the fluid outlet, and into a so-called sieve change position in which the sieve support is moved out of the housing cavity such that the one or more filter elements become accessible and can be exchanged or maintained. After the maintenance or exchange process the sieve support is moved into the filtering position afresh and the filtering operation is then continued.

In filtering apparatuses previously known from the state of the art the sieve support is generally arranged almost play-free in the cavity of the housing. That play-free arrangement of the sieve support in the housing cavity seals off the sieve support relative to the housing, thereby preventing melt from escaping even at high operating pressures.

In the processing of some melt materials however it has been found that a high level of sealing integrity between the sieve support and the housing cavity entails disadvantages. Thus when processing polycarbonate melts so-called "cracking" can be observed. In that case formed in the contact region between the sieve support and the housing cavity are carbon layers which can have the result that the sieve support becomes wedged in its mounting and can be removed only with a great effort and with a high force. When processing cellulose-based lyocell melts it has also been found that stagnation of the melt in the region between the sieve support and the housing cavity in combination with the sieve support or housing material—typically steel—can form an explosive mixture, and that is also undesirable.

To overcome some of the described disadvantages EP 0 915 729 B1 proposes arranging spacers of plastic on the sieve support, whereby a flow of fluid between the sieve support and the surrounding housing is to be made possible in region-wise fashion in operation of the arrangement. It has been found however that the proposed structure has the disadvantage that the spacers in question are arranged unequally and asymmetrically at the periphery of the sieve support, whereby difficulties are encountered in achieving exact guidance and in particular centring of the sieve support relative to the housing cavity.

In some areas of use there is also the disadvantage that the sieve support basic material, generally steel, has a different coefficient of thermal expansion in comparison with the proposed plastics. In addition the use of such spacers increases the manufacturing complexity of such sieve supports as fixing options have to be provided for the spacers on the sieve support. Depending on the respective plastic used the spacers further experience an increased amount of wear and therefore have to be regularly replaced.

SUMMARY

With that background in mind the object of the invention is to develop a filtering apparatus of the kind set forth in the opening part of this specification such that the disadvantages encountered in the state of the art are eliminated as far as possible. In particular the invention seeks to provide a filtering apparatus which permits exchange of the fluid between the sieve support and the housing cavity, ensures more precise guidance of the sieve support relative to the housing cavity and is more wear-resistant.

According to the invention the object is attained in the filtering apparatus in that the sieve support externally has a plurality of integrally formed raised portions and/or a non-rotationally symmetrical cross-section, and/or raised portions and/or recesses are formed at wall portions of the housing, that delimit the cavity, in such a way that provided between the wall portion and the sieve support are a plurality of gaps/cavities, by means of which a slight fluid flow is enabled in operation.

The invention is therefore based on the realisation of providing raised portions and/or recesses on the sieve support and/or the cavity-delimiting wall portions of the housing, wherein the raised portions and/or recesses are formed integrally with the respective body—sieve support and/or housing—and are accordingly integral and of the same material. The raised portions and/or recesses have the result that a plurality of gaps/cavities are formed between the wall portion and the sieve support so that in operation fluid can flow in those gaps/cavities, but the issue of fluid from the apparatus is so-to-speak at a minimum. The formation of carbon layers when processing polycarbonate melts or the creation of explosive mixtures when processing lyocell melts can be prevented thereby.

In that respect the integral configuration of the raised portions and/or recesses entails reduced manufacturing complexity in comparison with structures which comprise a plurality of parts and a plurality of materials. Both sieve support and also housing can be respectively produced from a single workpiece and inexpensively worked by means of standard working methods. In addition the one-piece or integral configuration of the raised portions and/or recesses has the advantage that all portions of the housing and the sieve support experience constant thermal expansion so that the gap dimensions which are involved remain very substantially constant even upon heating or cooling of the apparatus. In addition the raised portions are subject to a lesser degree of wear in comparison with a structure thereof comprising plastic. In that respect the occurrence of gap dimensions which are variable in dependence on wear is also avoided.

In a second aspect of the invention or in an advantageous development of the invention according to the first aspect it is proposed according to the invention that the sieve support externally has at least three and preferably four raised portions and/or provided at wall portions of the housing, that delimit the cavity are raised portions and/or recesses which are arranged distributed along the periphery of the sieve support in such a way that the sieve support is arranged substantially centred within the cavity of the housing in such a way that provided between the wall portion and the sieve support are a plurality of gaps/cavities, by means of which a slight fluid flow is enabled in operation.

Arranging the at least three raised portions along the sieve support periphery ensures that the sieve bolt is accommodated in centred relationship within the cavity of the housing and at the same time a slight fluid flow is made possible between the housing and the sieve support in operation of the arrangement.

In accordance with a preferred development the raised portions extend substantially in the direction of a longitudinal axis of the sieve support and rectilinearly, preferably over substantially the entire length of the sieve support. Not only can such raised portion geometries be produced exactly and by means of standard production methods but at the same time they also permit secure, centred and tilting-free guidance for the sieve support in the housing cavity.

It is further preferred that the raised portions are arranged spaced uniformly in the direction of the periphery of the sieve support. Uniform spacing of the raised portions in the direction of the periphery of the sieve support provides for exact centring of the sieve support within the housing cavity, wherein at the same time a large peripheral region of the sieve support is accessible in operation to the desired slight flow of fluid between the housing and the sieve support.

According to a preferred development the raised portions are of a height in the region of about 0.05 to 3 mm, preferably in the region of about 0.1 to 0.2 mm, in relation to the otherwise diameter of the sieve support. The specified height range has proven to be particularly suitable for achieving an adequate sealing action between the housing and the sieve support on the one hand and for permitting the desired slight fluid flow between the components on the other hand.

In addition in accordance with a preferred embodiment the raised portions are formed from a low-wear material, in particular metal or plastic. The use of metal has the advantage of the same or very substantially similar thermal expansion of the raised portions relative to the housing and the sieve support so that the gap dimensions which are involved remain very substantially constant. The use of plastics has also proven to be preferential for some areas of use or melt materials by virtue of a high level of chemical resistance of some plastics as well as the anti-friction properties thereof.

A further development of the invention provides that the sieve support perpendicularly to the sieve support longitudinal axis and/or the wall portion of the housing that delimits the cavity, is of a cross-section of equal thickness, said equal-thickness cross-section providing the raised portions of the sieve support and/or the raised portions and/or recesses of the wall portions.

The term equal-thickness cross-section is used to denote a cross-section in which two mutually oppositely disposed parallel support tangent lines which touch the cross-section are always at the same spacing relative to each other. The support tangent lines are to be so selected that they respectively have at least one point common with the boundary of the cross-section but no common point with an interior of the cross-section. In that respect the provision of an equal-thickness cross-section has proven to be particularly advantageous both in order to achieve exact centring of the sieve bolt relative to the housing cavity and also to provide a suitably sized gap or cavity in order to permit a slight fluid flow between the wall portion and the sieve support.

Preferably the housing wall portion that delimits the cavity is cylindrical, the sieve support perpendicularly to the longitudinal axis thereof being of an equal-thickness cross-section. A corresponding sieve support achieves the above-mentioned advantages and is compatible with existing housing systems.

According to an alternative embodiment the sieve support is cylindrical, wherein the housing wall portion delimiting the cavity is of an equal-thickness cross-section.

It is further preferred if cross-section of equal thickness is in the form of a triangular or quadrangular equal-thickness cross-section. Depending on the respective melt material to be processed and the desired degree of fluid flow between the wall portion and the sieve support the equal-thickness cross-section can be suitably selected in the form of a triangular or quadrangular cross-section.

A development of the invention provides that the equal-thickness cross-section is in the form of a Reuleaux triangle. Such a triangle is based on an equilateral triangle which has segments of a circle instead of the sides of the triangle. The radius of those segments corresponds to the side length of the underlying equilateral triangle. Making the equal-thickness cross-section in the form of a Reuleaux triangle affords on the one hand the advantage of easy manufacturing and on the other hand permits exact centring of the sieve support relative to the wall portion of the housing. The cross-sectional area is minimal in comparison with other equal-thickness structures, this resulting in an increased volume in respect of the gaps or cavities.

According to an alternative embodiment the sieve support perpendicularly to the sieve support longitudinal axis and/or the wall portion of the housing, that delimits the cavity, is of a polygonal cross-section, the cross-section in particular having three, four, five or more corners, wherein the corners are preferably rounded. According to an alternatively preferred embodiment the sieve support perpendicularly to the sieve support longitudinal axis and/or the wall portion of the housing, that delimits the cavity, is of a elliptical cross-section.

The configuration of the sieve support cross-section or wall portion cross-section in the form of a polygon or ellipse has proven to be an alternative advantageous configuration to ensure a sufficient fluid flow which can be well influenced between the wall portion and the sieve support, to centre the sieve support and the housing relative to each other and in addition to implement inexpensive manufacturability.

A further development of the invention provides that the sieve support is arranged radially and/or axially moveably in the cavity. It has been found in that respect that, besides the purely axial mobility of the sieve support, a radial movement component thereof can contribute to reducing the formation of carbon layers when processing polycarbonate melts as well as the formation of explosive mixtures when using lyocell melts by virtue of a radial or combined radial-axial movement of the sieve support.

The invention has been described hereinbefore with reference to a filtering apparatus. In a further aspect the invention concerns a valve arrangement, in particular for a plastic melt having impurities, comprising a housing which has at least one inlet for introduction of the fluid and at least one outlet for delivery of the fluid and a cavity formed in the housing by wall portions of the housing for receiving a valve bolt, and a valve bolt which is arranged moveably in the cavity of the housing for selectively enabling, distributing and/or blocking the fluid flow through the housing.

The valve arrangements previously known from the state of the art also involve the disadvantages described in relation to the filtering apparatus, in particular when processing polycarbonate melts concerning the deposit of carbon layers between the valve housing and the valve bolt as well as the risk of the formation of explosive mixtures when processing lyocell melts.

In that respect the invention attains the above-indicated object in relation to the valve arrangement in that the valve bolt externally has a plurality of integrally formed raised portions and/or a non-rotationally symmetrical cross-section and/or raised portions and/or recesses are formed at wall portions of the housing, that delimit the cavity, in such a way that provided between the wall portion and the valve bolt are a plurality of gaps/cavities, by means of which a slight fluid flow is enabled in operation.

The valve arrangement enjoys the same advantages as the filtering apparatus according to the invention. In particular the valve arrangement prevents or alleviates the deposit of carbon layers between the valve bolt and the valve housing when using polycarbonate melts by permitting a slight fluid flow between the wall portion and the valve bolt, whereby sluggishness in movement of the valve bolt or blocking of the valve bolt is avoided while in the case of lyocell applications the formation of explosive mixtures is prevented.

The integral configuration of the raised portions and/or recesses further simplifies manufacture, leads to predictable gap dimensions which are very substantially constant even when thermal expansion occurs and permits a high degree of centring of the components relative to each other.

According to a further aspect of the invention or according to an advantageous development of the valve arrangement according to the invention it is proposed that the valve bolt externally has at least three and preferably four raised portions and/or provided at wall portions of the housing, that delimit the cavity, there are provided raised portions or recesses which are arranged distributed along the periphery of the valve bolt in such a way that the valve bolt is arranged substantially centred within the cavity of the housing in such a way that formed between the wall portion and the valve bolt are a plurality of gaps/cavities, by means of which a slight fluid flow is made possible in operation.

A development of the invention provides that the raised portions extend substantially in the direction of the longitudinal axis of the valve bolt and rectilinearly, preferably substantially over the entire length of the valve bolt. According to a preferred embodiment the raised portions are arranged spaced uniformly in the direction of the periphery of the valve bolt. It is further preferred if the raised portions are of a height in the region of about 0.05 to 3 mm, preferably in the region of about 0.1 to 0.2 mm, in relation to the otherwise diameter of the valve bolt.

In a preferred embodiment the raised portions are formed from a low-wear material, in particular metal or plastic. A development of the invention provides that the valve bolt is of a cross-section of equal thickness perpendicularly to the valve bolt longitudinal axis and/or the wall portion of the housing that delimits the cavity, said cross-section providing the raised portions of the valve bolt and/or the raised portions and/or recesses of the wall portions. Preferably the cross-section of equal thickness is in the form of a triangular or quadrangular equal-thickness cross-section.

In regard to the advantages of such a configuration of the valve bolt and/or the housing wall portion delimiting the cavity reference is directed to the foregoing description concerning the filtering apparatus, which apply here in a similar fashion.

In a preferred embodiment the equal-thickness cross-section is in the form of a Reuleaux triangle. Such a cross-section can be manufactured with a low level of effort and cost, it permits a fluid flow in operation between the wall portion and the valve bolt and at the same time provides for centring of the valve bolt relative to the housing.

In an alternative embodiment the valve bolt perpendicularly to the valve bolt longitudinal axis and/or the cavity-delimiting wall portion of the housing is of a polygonal cross-section, in particular having 3, 4, 5 or more corners. Preferably the corners are rounded.

In a further alternative embodiment the valve bolt perpendicularly to the valve bolt longitudinal axis and/or the cavity-delimiting wall portion is of an elliptical cross-section.

In regard to the advantages of the embodiments just set forth attention is directed to the foregoing description concerning the filtering apparatus.

A development of the invention provides that the valve arrangement is in the form of one of the following: shut-off valve, distributor valve. The described types of valve are frequently used in apparatuses for processing plastic melt.

BRIEF DESCRIPTION OF THE DRAWINGS

The invention is described in greater detail hereinafter by means of preferred embodiments by way of example with reference to the accompanying Figures in which.

DETAILED DESCRIPTION

Figure 1:
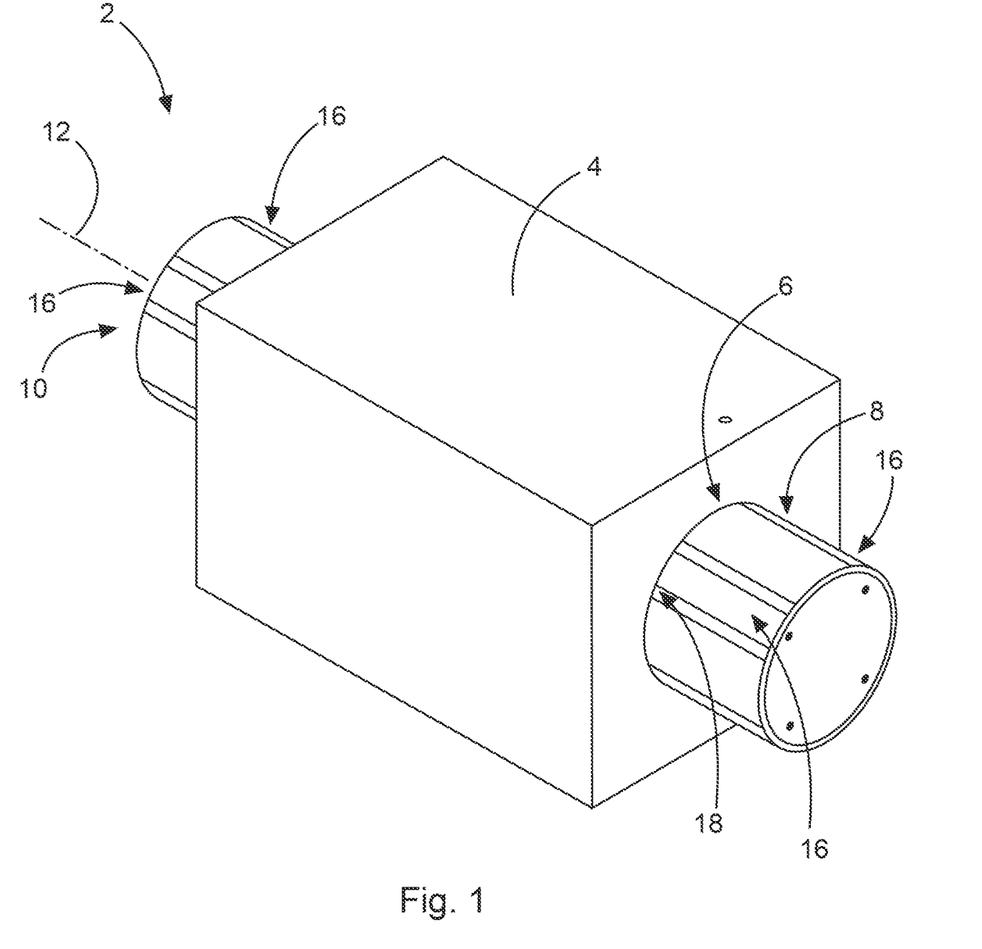
FIG. 1 shows a perspective view of a first embodiment of a filtering apparatus according to the invention.

FIG. 1 shows a filtering apparatus 2 having a housing 4 with a receiving cavity 8 in which a sieve support 10 is received. The sieve support 10 is arranged moveably with respect to the cavity 8 in the direction of a sieve support longitudinal axis 12. The housing 4 in per se known manner has an inlet for introduction of a fluid to be filtered and an outlet for delivery of the filtered fluid (not shown).

Figure 2:
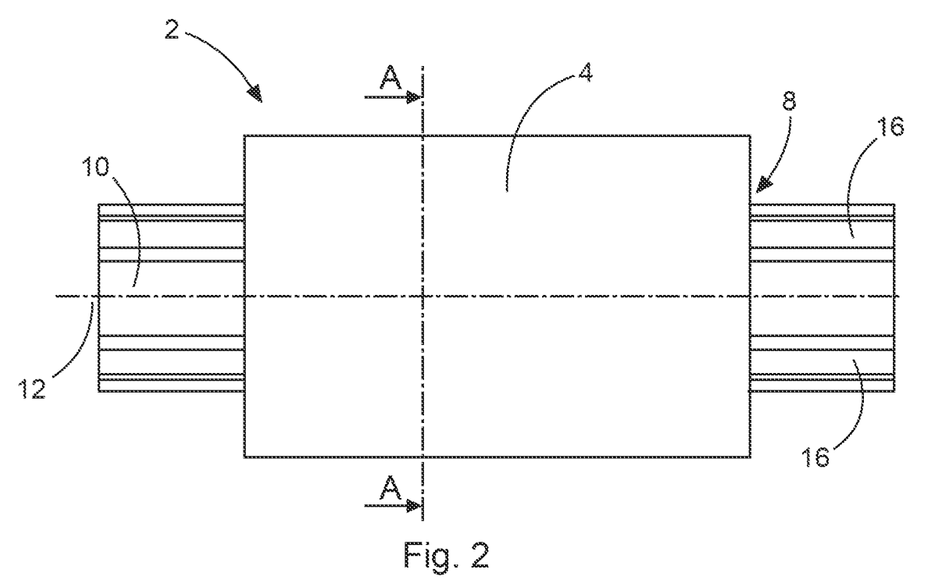
FIG. 2 shows a side view of the embodiment of the filtering apparatus according to the invention as shown in FIG. 1.

At its outside the sieve support 10 has a plurality of integral sieve support raised portions 16. The receiving cavity 8 of the housing 4 is cylindrical. The consequence of this is that gaps or cavities 18 are formed between the receiving cavity 8 and the sieve support 10 in the region of housing wall portions 6, by means of which gaps or cavities a slight fluid flow is possible in operation. FIG. 2 shows a side view of the filtering apparatus.

Figure 3:
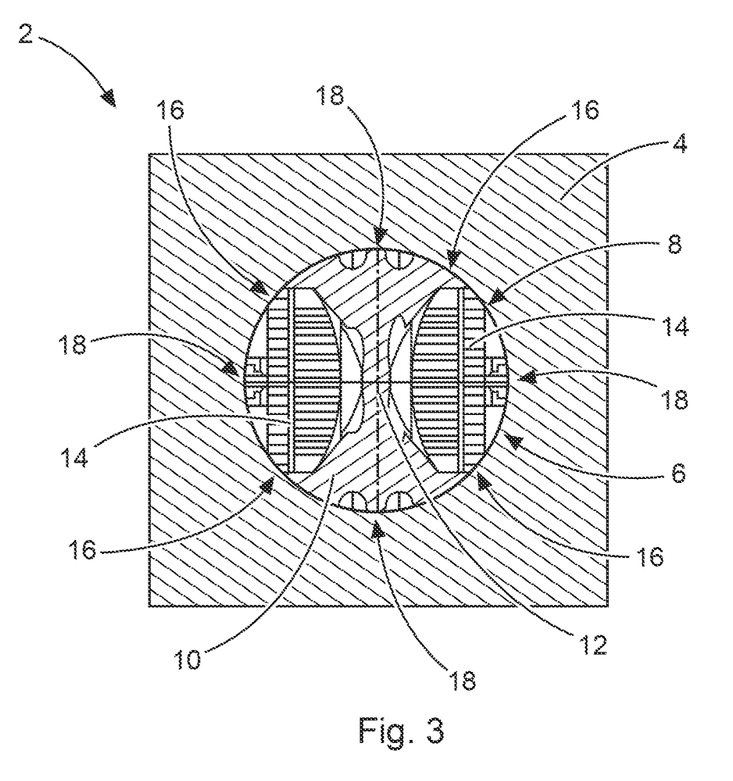
FIG. 3 shows a sectional view of the embodiment of the filtering apparatus according to the invention as shown in FIGS. 1 and 2, FIGS. 4 and 5 show further views of the filtering apparatus according to the invention as shown in FIGS. 1 to 3, FIGS. 6 and 7 show a perspective view and a side view of a sieve support according to the invention.

FIG. 3 shows the structural configuration of the sieve support 10 by means of a sectional view, in section along the plane A-A in FIG. 2. The sieve support 10 has filter elements 14, by means of which the fluid is filtered. In the present case the sieve support 10 has a total of four sieve support raised portions 16 arranged uniformly spaced around the periphery of the sieve support 10. Besides centring the sieve support in the receiving cavity 8, the arrangement of the sieve support raised portions 16 provides that a plurality of gaps or cavities 18 are formed between the wall portion and the sieve support 10, wherein a fluid flow is made possible in operation within those gaps or cavities 18.

Figure 4:
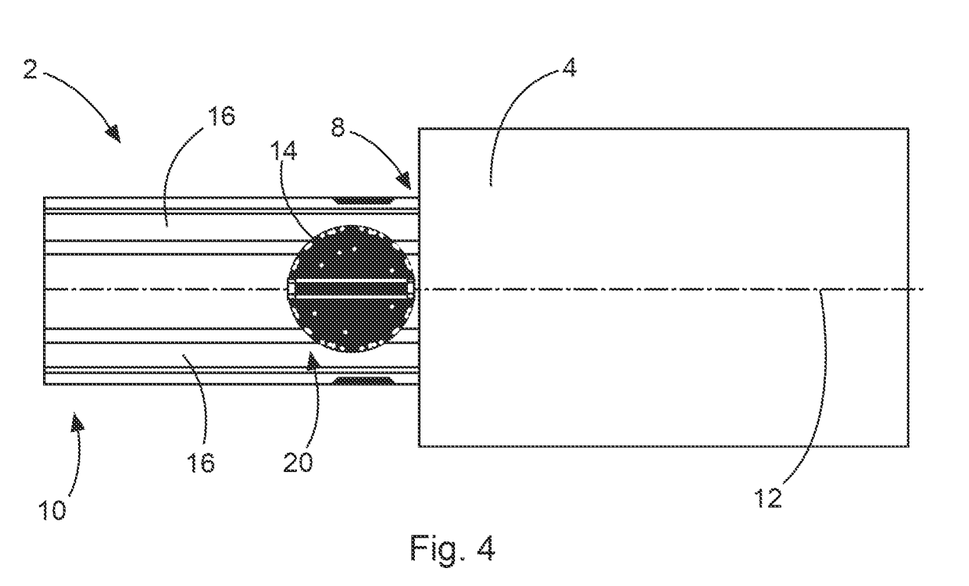
Figure 5:
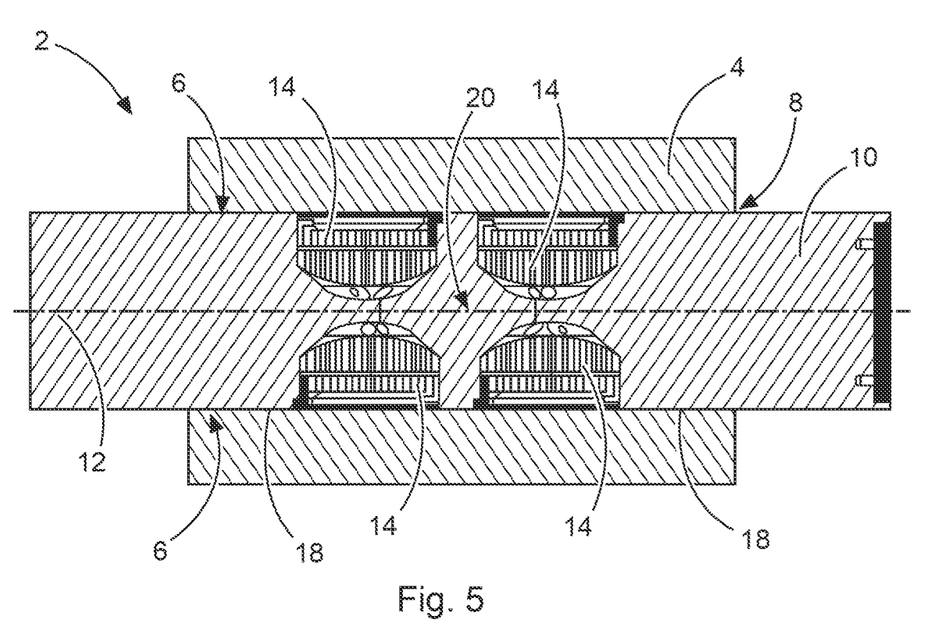

FIG. 4 shows the filtering apparatus 2 in a so-called sieve change position. The sieve support 10 is moved out of the housing 4 to such an extent that one of the filter elements 14 is accessible from outside the housing 4 and can be replaced or subjected to a maintenance procedure. In FIG. 5 the filtering apparatus 2 is in an operating position in which fluid can be filtered by means of the filter elements 14. The filter elements 14 are not accessible from outside the filtering apparatus 2 in the filtering position.

Figure 6:
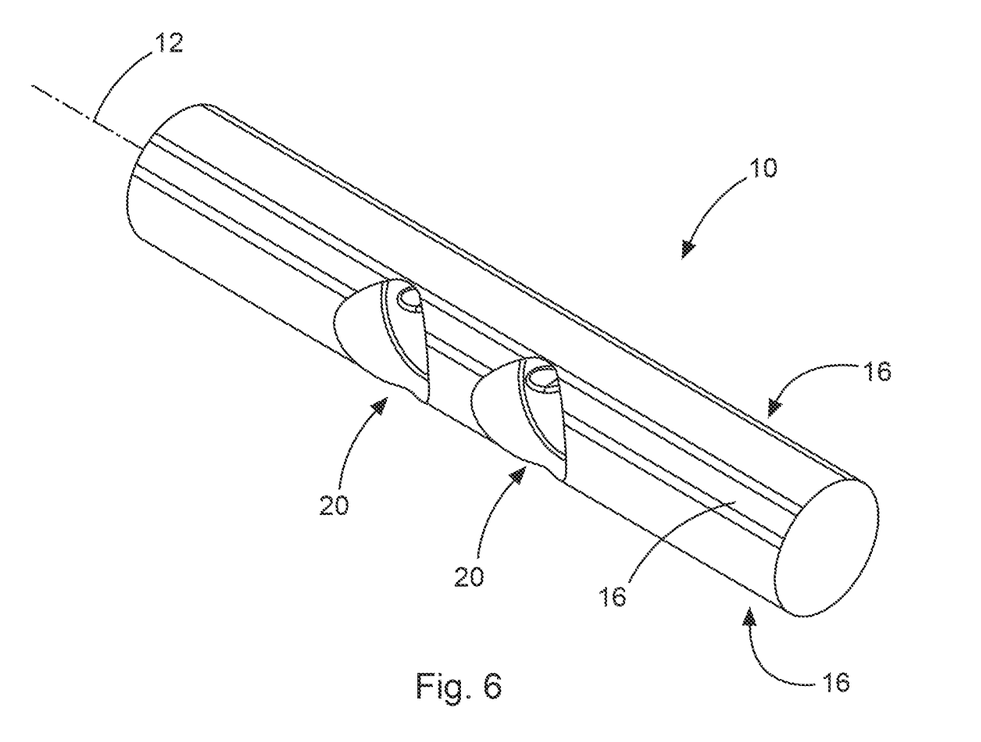
Figure 7:
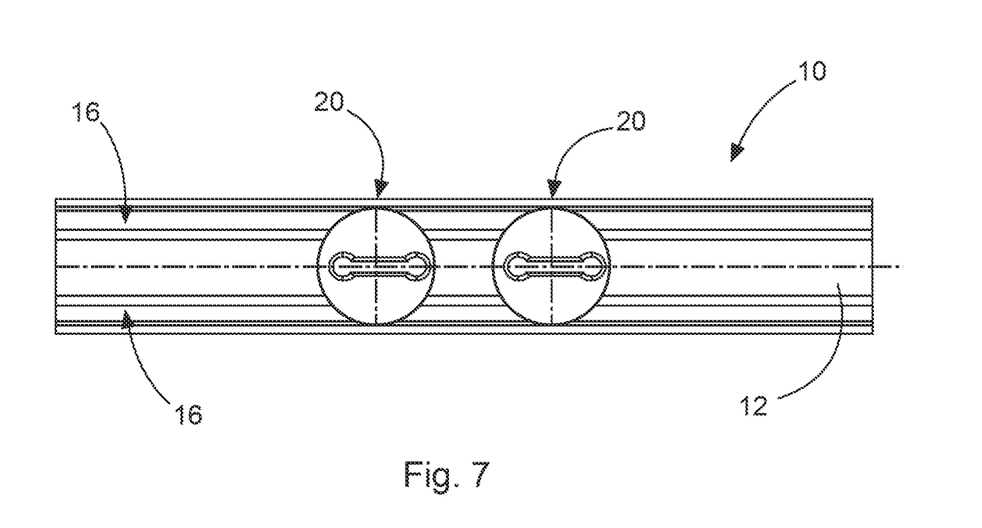

FIGS. 6 and 7 show a sieve support 10 without filter elements 14 fitted into the filter element mountings 20. The sieve support raised portions 16 in the present case are arranged spaced uniformly around the periphery of the sieve support 10 and extend in the direction of the longitudinal axis 12 of the sieve support 10 and rectilinearly.

Figure 8A:
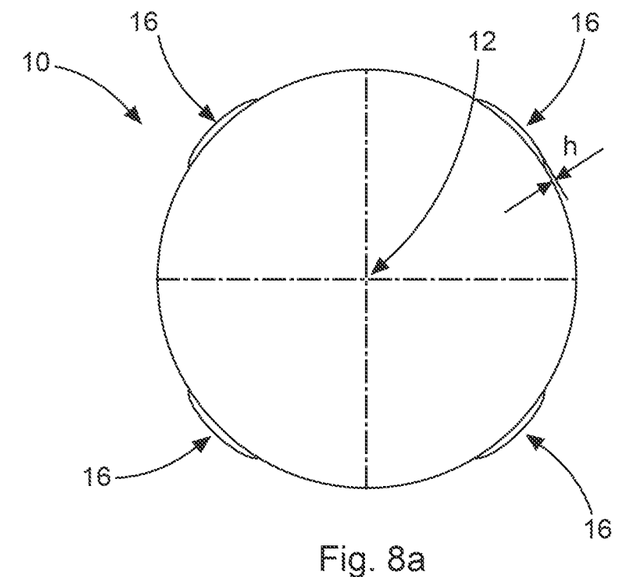
FIG. 8a shows a cross-sectional view of the sieve support according to the invention.

The cross-section of the sieve support 10 is shown in FIG. 8a. Once again the Figure shows the arrangement of the sieve support raised portions 16, spaced uniformly around the periphery. In the present case the sieve support 10 has four sieve support raised portions, the invention however not being restricted to that arrangement. Rather, it is also possible to arrange three sieve support raised portions 16 on the sieve support 10 or even a larger number of raised portions 16. The raised portions 16 extend in the direction of the longitudinal axis 12 of the sieve support 10 and in particular rectilinearly. The raised portions 16 are of a height h in the region of about 0.05 to 3 mm, preferably in the region of about 0.1 to 0.2 mm, in relation to the otherwise diameter of the sieve support 10. In the present case the raised portions 16 are formed from metal but can also be formed from another, preferably low-wear material like in particular plastic.

Figure 8B:
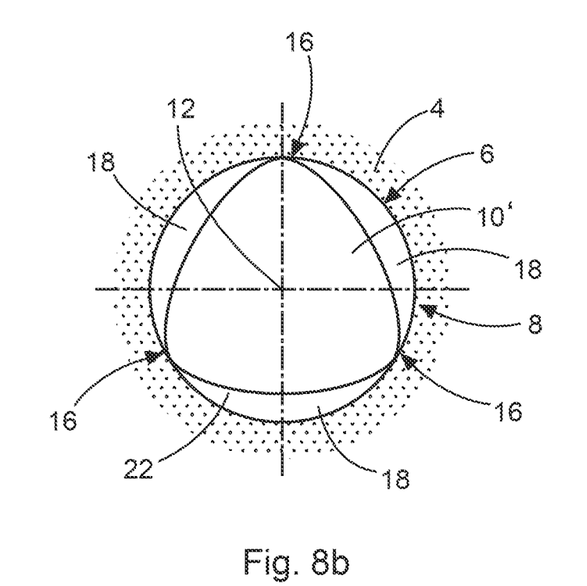
FIG. 8b shows a sectional view of an alternative embodiment of a sieve support according to the invention.

FIG. 8b shows an alternative embodiment of a sieve support 10'. The sieve support 10' arranged in a cylindrical receiving cavity 8 is of an equal-thickness cross-section 22. In the present case the equal-thickness cross-section 22 is in the form of a triangular equal-thickness cross-section 22. In comparison with the embodiment of a sieve support 10 shown in FIG. 8a the sieve carrier 10' shown in FIG. 8b has larger gaps or cavities 18 between the housing wall portion 6 and the sieve support 10'. Basically as a result the configuration of the sieve support 10' with the equal-thickness cross-section 22 permits a greater fluid flow between the receiving cavity 8 and the sieve support 10', with the sieve support 10' at the same time being centred exactly in the cavity 8.

FIGS. 9 to 13 show an embodiment of a shut-off valve 102 having a housing 104 which has wall portions 106 and forms a receiving cavity 108. The shut-off valve 102 is based on the same inventive idea as the filtering apparatus 2. The housing 104 has a first inlet/outlet 120 and a second inlet/outlet 122. Arranged in the receiving cavity 108 is a valve bolt 110 which is arranged moveably axially along a valve bolt longitudinal axis 112 relative to the housing 104.

The valve bolt 110 has a continuous flow passage in the form of a preferably cylindrical bore 124 which, when it is in fluidic communication with the first inlet/outlet 120 and the second inlet/outlet 122 by virtue of appropriate positioning of the valve bolt 110 relative to the housing 104, enables a passage from the first inlet/outlet 120 to the second inlet/outlet 122 and blocks a fluid flow from the first inlet/outlet 120 to the second inlet/outlet 122, when the flow passage is in non-fluidic communication with the first inlet/outlet 120 and the second inlet/outlet 122.

Figure 9:
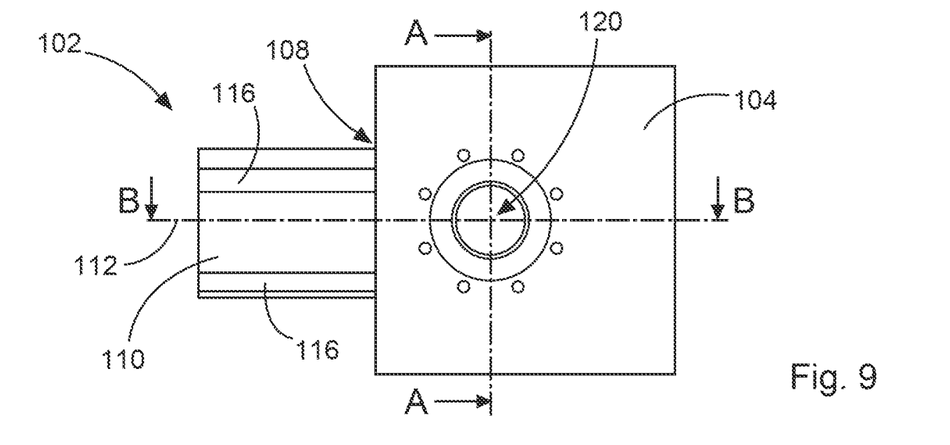
FIGS. 9 to 13 show various views and operating states of an embodiment of a shut-off valve according to the invention.
Figure 10:
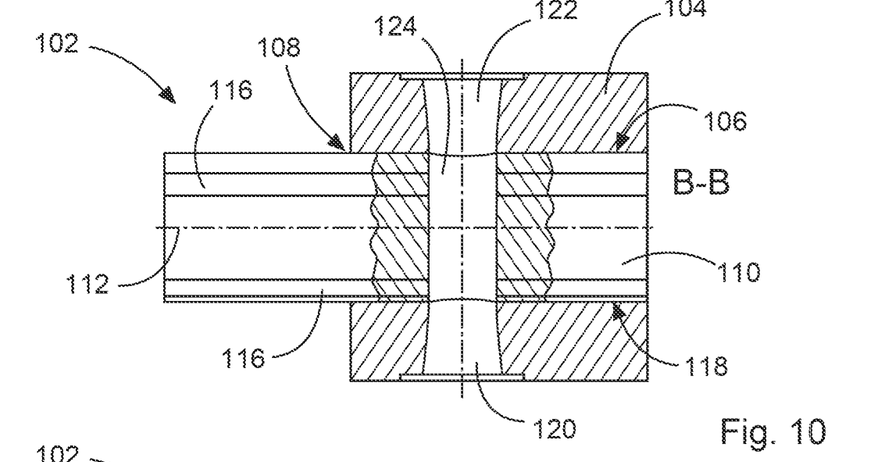
Figure 11:
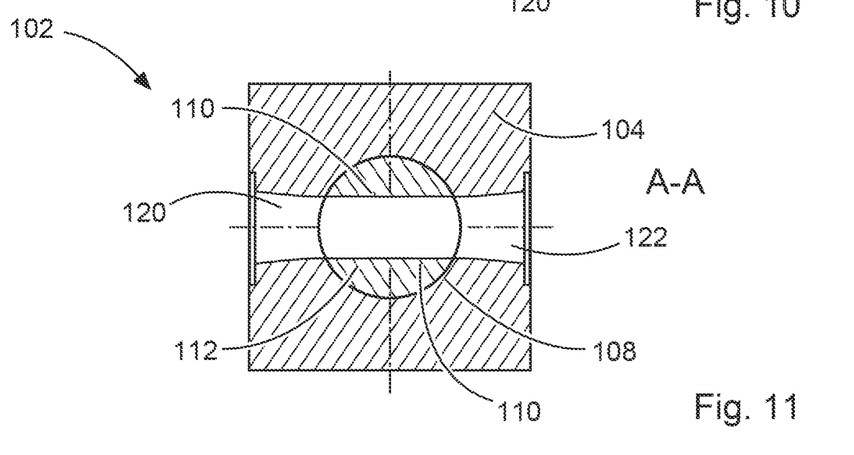
Figure 12:
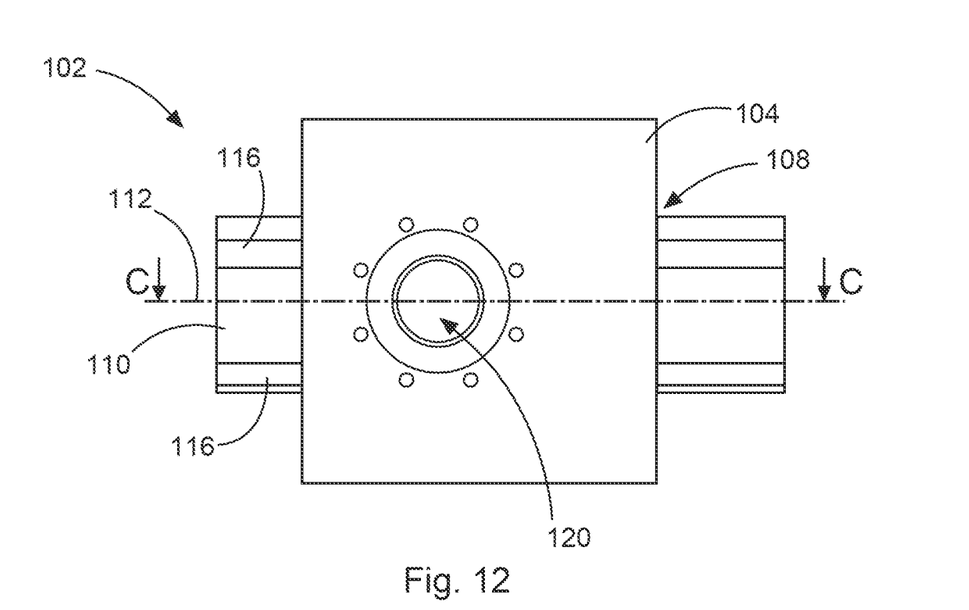
Figure 13:
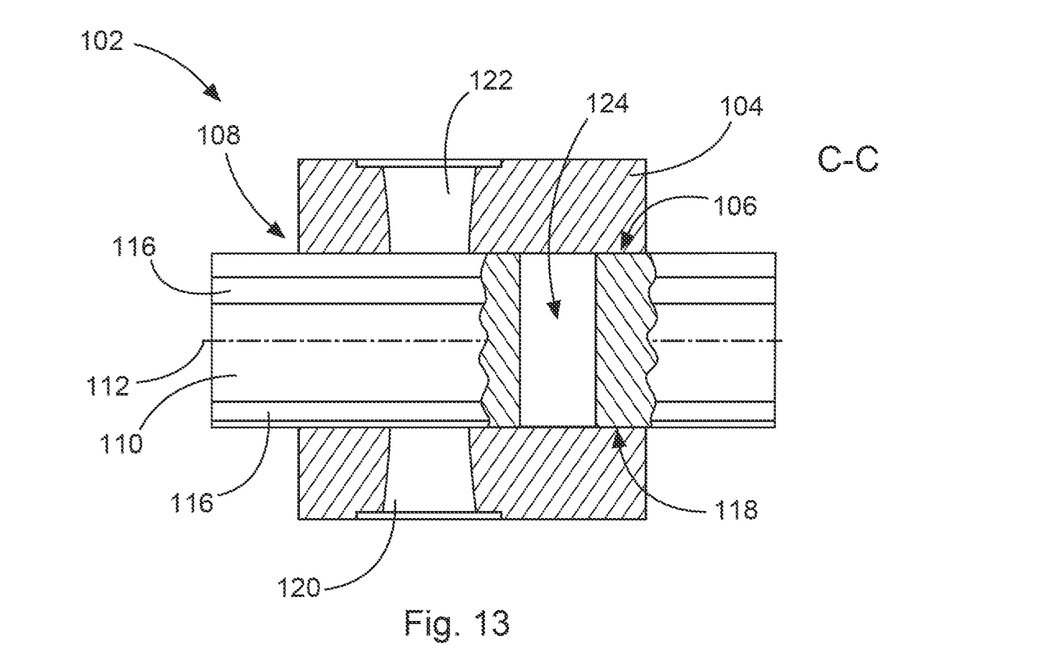

In the operating state shown in FIGS. 9 to 11 the shut-off valve 102 is thus in a passage position in which a fluid flow is enabled from the first inlet/outlet 120 to the second inlet/outlet 122. When the valve bolt 110 is moved into the position shown in FIGS. 12 and 13 the valve bolt 110 blocks a fluid flow from the first inlet/outlet 120 to the second inlet/outlet 122. The shut-off valve 102 is in a blocking position in the state shown in FIGS. 12 and 13.

At its outside the valve bolt 110 has a plurality of integral valve bolt raised portions 116. The receiving cavity 108 of the housing 104 or the corresponding housing wall portions 106 form a cylindrical cavity. As also in the similar way in respect of the filtering apparatus 2, that has the result that gaps or cavities 118 are formed in the regions between the raised portions 116 and the wall portions 106, with a slight fluid flow being possible in operation in those gaps or cavities 118. Arranging the valve bolt raised portions 116 along the periphery of the valve bolt 110 also provides that it is substantially centred within the cavity 108 of the housing 104.

According to the invention in this case the valve bolt 110 can alternatively be of a rotationally symmetrical configuration and the housing wall portions 106 can have raised portions and/or recesses. In addition in accordance with the invention both the valve bolt 110 can have integral raised portions 116 and/or can be of a non-rotationally symmetrical cross-section and also the housing wall portions 106 in turn can have raised portions and/or recesses. Similarly to the view in FIG. 8a the valve bolt 110 can have a plurality of raised portions 116 which are uniformly spaced around its periphery or however, as shown in FIG. 8b, it can have an equal-thickness cross-section or a polygonal or elliptical cross-section.

LIST OF REFERENCES USED 2 filtering apparatus
4 housing
6 housing wall portions
8 receiving cavity
10, 10' sieve support
12 sieve support longitudinal axis
14 filter element
16 sieve support raised portions
18 gap/cavity
20 filter element mounting
22 equal-thickness cross-section (triangular)
h height of the raised portions
102 shut-off valve
104 housing
106 housing wall portions
108 receiving cavity
110 valve bolt 112 valve bolt longitudinal axis
116 valve bolt raised portions
118 gap/cavity
120 first inlet/outlet
122 second inlet/outlet
124 flow passage
202 distributor valve
204 housing
206 housing wall portions
208 receiving cavity
210 valve bolt
212 valve bolt longitudinal axis
216 valve bolt raised portions
218 gap/cavity
220 first inlet/outlet
222 second inlet/outlet
224 third inlet/outlet
226 fourth inlet/outlet
228 upper inlet/outlet

The invention claimed is:

1. A filtering apparatus for filtering a fluid, comprising
a housing which has at least one inlet for introduction of the fluid and an outlet for delivery of the fluid and a cavity formed in the housing by wall portions of the housing for receiving a sieve support, and
a sieve support which is arranged moveably in the cavity of the housing and has a longitudinal axis, wherein the sieve support comprises at least one filter element mounting that is configured to receive at least one filter element for filtering the fluid,
wherein 1) the sieve support externally has a plurality of integrally formed raised portions, the plurality of integrally formed raised portions being formed integrally with the sieve support and of the same material, and/or a non-rotationally symmetrical cross-section, and/or wherein 2) raised portions and/or recesses are formed at wall portions of the housing, that delimit the cavity,
such that provided between the wall portions and the sieve support are a plurality of gaps/cavities, whereby a fluid flow is enabled in operation through the plurality of gaps/cavities between the sieve support and the wall portions regardless of an axial position of the sieve support while the at least one filter mount is positioned in an operational position within the housing.

2. A filtering apparatus according to claim 1
wherein the sieve support externally has at least three integrally formed raised portions and/or provided at wall portions of the housing, that delimit the cavity are raised portions and/or recesses which are arranged distributed along a periphery of the sieve support in such a way that the sieve support is arranged centered within the cavity of the housing
in such a way that provided between the wall portion and the sieve support are the plurality of gaps/cavities, by means of which the fluid flow is enabled in operation.

3. A filtering apparatus according to claim 1
wherein the raised portions extend in a direction of the longitudinal axis of the sieve support and rectilinearly.

4. A filtering apparatus according to claim 1
wherein the raised portions are arranged uniformly spaced in a direction of a periphery of the sieve support.

5. A filtering apparatus according to claim 1
wherein the raised portions are of a height (h) in a region of about 0.05 to 3 mm, in relation to a diameter of the sieve support offset from the raised portions.

6. A filtering apparatus according to claim 1
wherein the raised portions are formed from a metal or a plastic.

7. A filtering apparatus for filtering a fluid, comprising
a housing which has at least one inlet for introduction of the fluid and an outlet for delivery of the fluid and a cavity formed in the housing by wall portions of the housing for receiving a sieve support, and
a sieve support which is arranged moveably in the cavity of the housing and has a longitudinal axis for receiving at least one filter element for filtering the fluid,
wherein the sieve support externally has a plurality of integrally formed raised portions and/or a non-rotationally symmetrical cross-section, and/or raised portions and/or recesses are formed at wall portions of the housing, that delimit the cavity,
such that provided between the wall portions and the sieve support are a plurality of gaps/cavities, whereby a fluid flow is enabled in operation,
wherein the sieve support perpendicularly to the longitudinal axis and/or the wall portion of the housing that delimits the cavity, is of a cross-section of equal thickness, said cross-section providing the raised portions of the sieve support and/or the raised portions and/or recesses of the wall portions.

8. A filtering apparatus according to claim 7
wherein the cross-section of equal thickness is in the form of a triangular or quadrangular equal-thickness cross-section.

9. A filtering apparatus according to claim 7
wherein the cross-section of equal thickness is in the form of a Reuleaux triangle.

10. A filtering apparatus according to claim 1
wherein the sieve support perpendicularly to the sieve support longitudinal axis and/or the wall portion of the housing, that delimits the cavity, is of a polygonal cross-section, the cross-section in particular having three or more corners.

11. A filtering apparatus according to claim 1
wherein the sieve support perpendicularly to the sieve support longitudinal axis and/or the wall portion of the housing, that delimits the cavity, is of a elliptical cross-section.

12. A filtering apparatus according to claim 1
wherein the sieve support is arranged radially and/or axially moveably in the cavity.

13. A valve arrangement, comprising
a housing which has at least one inlet for introduction of a fluid and at least one outlet for delivery of the fluid and a cavity formed in the housing by wall portions of the housing for receiving a valve bolt, and
a valve bolt which is arranged moveably in the cavity of the housing for selectively enabling, distributing and/or blocking the fluid from flowing through the housing,
wherein the valve bolt externally has a plurality of integrally formed raised portions and/or a non-rotationally symmetrical cross-section and/or raised portions and/or recesses are formed at wall portions of the housing, that delimit the cavity, in such a way that provided between the wall portions and the valve bolt are a plurality of gaps/cavities, whereby the valve bolt is configured such that when the valve bolt is in a closed position a fluid flow is enabled in operation through at least one flow path, defined by the plurality of gaps/cavities, between the valve bolt and at least one of the wall portions.

14. The valve arrangement according to claim 13, wherein the valve bolt perpendicularly to a longitudinal axis of the valve bolt and/or the wall portions of the housing that delimits the cavity, is of a cross-section of equal thickness, and said cross-section providing the plurality of integrally formed raised portions of the valve bolt and/or the raised portions and/or recesses of the wall portions.

15. The valve arrangement according to claim 13, wherein when the valve bolt is in an open position the fluid flows through the inlet, the valve bolt, and the outlet at a first flow rate, and wherein the valve bolt is configured such that when the valve bolt is in the closed position the fluid flow enabled in operation between the valve bolt and the at least one of the wall portions is a second flow rate that is less than the first flow rate.

16. The valve arrangement according to claim 15, wherein when in the closed position the valve bolt is configured to block the fluid flow from flowing to the outlet, whereby the fluid flow does not exit the outlet at the first flow rate.

17. The filtering apparatus according to claim 1, wherein the fluid flow is enabled in operation through each of the plurality of gaps/cavities between the sieve support and the wall portions regardless of the axial position of the sieve support while the at least one filter mount is positioned in the operational position within the housing.

18. The filtering apparatus according to claim 1, wherein each of the plurality of gaps/cavities extends along the longitudinal axis beyond the housing in operation.

19. The filtering apparatus according to claim 1, wherein one or more of the plurality of gaps/cavities extends along the longitudinal axis a length greater than that of the at least one filter element mounting.

20. The filtering apparatus according to claim 1, wherein the sieve support perpendicularly to the sieve support longitudinal axis and/or the wall portion of the housing that delimits the cavity, is of a cross-section of equal thickness, said cross-section providing the raised portions of the sieve support and/or the raised portions and/or recesses of the wall portions.

* * * * *